2,975,071
Patented Mar. 14, 1961

2,975,071
THICKENED COMPOSITIONS AND METHOD OF MAKING THE SAME

Thomas H. Ferrigno, Metuchen, N.J., assignor to Minerals & Chemicals Philipp Corporation, a corporation of Maryland No Drawing. Filed Feb. 4, 1958, Ser. No. 713,098

6 Claims. (Cl. 106—260)

This invention relates to novel thickened film-forming compositions and to a method of making the same. More particularly the invention relates to thixotropic coating compositions based on film-forming ester-containing materials (hereinafter called "esterbodies") and including a mineral filler.

Although the compositions provided by my invention are applicable in numerous fields, they will be described with particular reference to their use in protective coatings and particularly paints. The advantages of gelled or highly thixotropic paints, especially paints applied by brushing, has long been recognized. Desirable characteristics resulting from the thixotropic consistency include ease of brushing, lack of sagging, elimination of settling and flooding of the pigment, spill resistance of the composition and low penetration into the substrate.

Some degree of bodying of paints or paint vehicles has been achieved in the past by use, inter alia, of soaps, soap solutions, limed oils and varnishes, bodied oils and the like, and of very fine or chemically modified pigments. Such methods usually provide compositions of somewhat thixotropic consistency which are possessive of various degrees of stiffness, and resistance to spill, sag and settling. However, such prior art methods have been unsuccessful in achieving a degree of thixotropy sufficient to provide the required ease of brushing. Furthermore, such methods usually entail the use of high shear dispersion equipment, or expensive processing. Frequently such gelling methods impair the drying characteristics, color retention, weather resistance, etc., of the formulation in which they are incorporated.

Another approach to produce a truly thixotropic vehicle is described in U.S. Patent No. 2,663,649 to Winkler. Therein a polyamide resin, normally insoluble in solvents used in the paint industry, is heated with an esterbody to provide a vehicle which produces a thixotropic composition when incorporated in mineral spirits and the like. This vehicle, which is compatible with hydrocarbon thinners, is suitable for use as is or as an ingredient in making gelled paints or the like. The formulation of such a gelled vehicle lacks versatility in that gelation is achieved only within narrow ester-vehicle composition ranges and when processing is carried out within restrictive time and temperature conditions. Hence, modification of the vehicle to obtain specific properties, such as improved alkali resistance, improved color retention and reduced costs is considerably limited.

Accordingly, a principal object of my invention is to provide novel thixotropic bodied compositions including film-forming carboxylic esterbodies. Another and important object is the provision of gelled thixotropic paint compositions which include a film-forming esterbody and the requisite solvent and pigments for use as protective or decorating coating compositions. Another object is the provision of gelled paint compositions based on esterbodies, which compositions have outstanding thixotropic and drying characteristics. Furthermore, an object is the provision of a simple method to gel thixotropically a variety of film-forming carboxylic acid esterbodies in association with the requisite ingredients for a finished coating formulation. Other objects and advantages of my invention will be readily apparent from a reading of a description thereof which follows.

The instant invention is the result of my discovery that certain high-molecular weight esterbodies normally copolymerizable with polyisocyanates to form irreversibly gelled compositions are rendered into compositions of thixotropic consistency when a restricted amount of polyisocyanate is dispersed in the esterbody in the presence of a particulated hydrated siliceous mineral. When the esterbody is of the type having film-forming characteristics by virtue of the presence of unsaturated substituents therein the resultant thixotropic composition has utility as a coating. In a preferred embodiment of the invention a gelled thixotropic coating composition is provided which includes in homogeneous stable association a film-forming esterbody, a small amount of polyisocyanate, a hydrated siliceous mineral, a thinner or solvent for said esterbody, additional pigments and such additives as may be of utility in the formulation. In the compositions of my invention a siliceous mineral modifies the reaction between an esterbody and an organic polyisocyanate, said esterbody and said polyisocyanate being such as to form a non-thixotropic irreversibly gelled mass in the absence of said siliceous mineral. Although I do not wish in any way to be bound or restricted by the hypothesis hereinafter set forth, it is believed that the phenomenon is explained as follows. Isocyanates are known to be highly reactive with various organic compounds and also with mineral pigments having hydroxyl groups on the surfaces thereof. Isocyanates react with free carboxyl, hydroxyl, or ester linkages of esterbodies, the mechanism and extent of interaction depending on concentration of reactants, auxiliary wetting or contact agents, degree of dispersion of reactants, etc. In compositions within the scope of the instant invention the isocyanate, being polyfunctional, may react both with the oxygenated linkages of esterbodies and with the mineral particles, thereby linking the mineral particles with molecules of the esterbodies thus causing the formation of micelles. The micelles entrap solvent and/or ester molecules through various temporary valence forces such as Borden's or Van der Waals' forces. This micelle formation, or whatever mechanism is in fact responsible, produces a seemingly solid mass which, however, will break down to a liquid upon agitation or application of sufficient shear to break the temporary valence bonds.

The method of my invention is one utilizing the basic methods and techniques commonly used in the paint industry and comprising the steps of: mixing a vehicle comprising an esterbody, particularly a liquid or liquefied film-forming esterbody, with a small quantity of a polyisocyanate in the presence of a siliceous mineral. The siliceous mineral may be incorporated in the formulation at any time prior to the advance of gelation resultant from the reaction between the polyisocyanate and the esterbody. However, satisfactory results will not be obtained when the siliceous mineral is reacted with the polyisocyanate as a step antecedent to the inclusion of said siliceous mineral in the formulation. The esterbody-siliceous mineral-polyisocyanate composition is dispersed to the requisite degree suitably by the use of various paint dispersion equipment such as three- or five-roll mills, high speed stone mills or the like. The aforementioned steps are preferably carried out in the absence of added heat.

In accordance with one embodiment of the invention a dispersion of an ester vehicle including the novel siliceous mineral and polyisocyanate is prepared as above described and, after a suitable period, is permitted to set into a gel or the like which may be readily admixed with other constituents of a paint or a coating formulation. Pursuant to another embodiment of the invention the paste produced by the dispersion of mineral and polyisocyanate in the esterbody is combined with a solvent thinner, and optionally other additives, prior to the gelation of the modified esterbody whereby the solvent and such other additives as may be incorporated are included in the gel during its initial formation.

Suitable polyisocyanates for the purposes of my invention include alkyl, aryl and aralkyl polyisocyanates, saturated or unsaturated. However, from a standpoint of performance, preferred compounds are aryl and aralkyl polyisocyanates, such as, for example, 2,4 tolylene diisocyanate; 3,3'bitolylene 4,4'diisocyanate; 3,3'dimethyldiphenyl methane 4,4'diisocyanate; 2,6 tolylene diisocyanate; diphenyl methane 4,4'diisocyanate; m-phenylene diisocyanate, 3,3'dimethoxydiphenyl 4,4'diisocyanate, 2'5, 5'tetramethyl diphenyl 4,4'diisocyanate, diphenyl sulfonyl 4,4'diisocyanate, triphenyl methane triisocyanate, and others.

I have found that an organic polyisocyanate in amount within the range from about 0.5 to 5.0%, and preferably from about 1.0 to 3.0% (based on the weight of the esterbody), is adequate to effect thixotropic thickening or gelation of an ester-containing fluid when said polyisocyanate acts in concert with a polyisocyanate-reactive pigment in accordance with the teachings of my invention. When the polyisocyanate is used in amount beyond about 5% of the weight of the esterbody the reaction therebetween is sufficiently extensive that the composition solidifies or gels to a non-thixotropic unsuitable mass, such formation being referred to herein as irreversible gelation. When, on the other hand, less than about 0.5% of polyisocyanate is used, the thickening is minimal and with some esterbodies is negligible.

Pigments which cooperate with the polyisocyanates to render esterbodies into thixotropic masses include those naturally-occurring hydrated siliceous minerals which react at least to some degree with the polyisocyanates, probably by virtue of hydroxyl sites on the surfaces of said pigments. The term "hydrated" as used herein appertains to minerals including chemically bonded water or water of constitution, such bonded water being distinguished from free moisture which is loosely held by physical bonds to a mineral. Pigments having a high oil absorption number, that is greater than about 150, may not be used in the practice of my invention since they thicken the esterbody even in the absence of the polyisocyanate to produce tacky compositions devoid of the degree of thixotropy requisite for the provision of satisfactory film-forming coating. For this reason, xerogels and aerogels such as, for example, silica aerogel, are not useful in compositions of my invention. Hydrated siliceous pigments as exemplified by calcium silicates (natural or synthetic), magnesium silicates (natural or synthetic) and kieselguhr may be used. Clays such as those containing as a principal mineral constituent at least one of the following: kaolinite, halloysite, montmorillonite, or attapulgite are particularly useful. The pigments are preferably employed in my systems in a substantially dry condition although small amounts of moisture may be tolerated therein. The pigment preferably has an equivalent spherical diameter less than about 50 microns and may be of colloidal dimension. Thickening does not depend on the sorptivity of the pigment since very satisfactory thickened systems are obtained by use of kaolinitic clays which are nonsorptive and noncolloidal. The minimum effective quantity of isocyanate-reactive mineral necessary to effect adequate thickening of the esterbody when used in cooperation with the polyisocyanate will vary with mineral specie, in the case of attapulgite being about at least seven times, on a weight basis, the quantity of polyisocyanate used. Some thickening will result with lower weight ratios of attapulgite to isocyanate although the amount will in general be insufficient to provide the requisite degree of thixotropy sought in coating compositions when the usual methods of paint dispersion are employed. However, lower pigment-isocyanate ratios may be used when very high shear dispersion equipment, elevated temperatures, etc., are employed. The maximum quantity of polyisocyanate reactive pigment useful in thixotropic coating composition is dictated only by the requirements of that formulation. For example, in an enamel composition made in accordance with my invention the formulator may find that the minimum quantity of pigment required to achieve thickening or gelation will suffice. In a semi-gloss enamel somewhat higher amounts of pigment may be used, usually from 40 to 60 percent of the non-volatile volume of the composition.

Other pigments, such as titanium dioxide, calcium carbonate or calcium sulfate, may be used to supplement the isocyanate-reactive pigment to achieve the requisite pigment volume concentration. Total pigment concentration in flat paints is considerably higher than in enamel or semi-gloss paints, usually from about 40 to 85 percent of the non-volatile volume of the composition. In flat paints, as well as in other formulations, pigments non-reactive with the isocyanates may be used to build up the pigment concentration.

Pursuant to the preferred embodiment of my invention a complete coating formulation is provided by the thixotropic gelation or thickening in situ of a system comprising an esterbody, a solvent or thinner therefor, additional additives as required and the novel combination of siliceous mineral and polyisocyanates, all components being present in suitable proportions. Compositions thus provided include consumer's products such as paints (including enamels, semi-gloss and flat paints), inks and the like. Such thickened compositions including solvents are made in accordance with my invention when the solvent or at least a substantial portion thereof is non-reactive with either the film-forming ester or the polyisocyanate. Suitable solvents include hydrocarbons, saturated or unsaturated, aromatic or aliphatic, and are exemplified by mineral spirits, turpentine, and xylene. Other useful solvents include ketones, such as acetone, methyl ethyl ketone and diethyl ketone. In compositions in which polyisocyanate is used in an amount of from about 0.5 to 5.0 percent by weight of the ester and when the polyisocyanate-reactive pigment is present in an amount of at least about seven times that of the polyisocyanate, considerable thickening will take place in an ester-based composition which includes up to about 15 parts of solvent per part of esterbody on a weight basis. True gelation will ordinarily be effected within a solvent to esterbody ratio of up to about 10 to 1.

Esterbodies gelled or bodied by the concerted action of the polyisocyanate and filler reactive therewith include those ester-containing vehicles whose carboxyl and/or hydroxyl groups are reactive with the polyisocyanate. Suitable esterbodies are liquid at room temperature or are supplied as vehicles including solubilized esters. A variety of useful coating compositions are provided when the ester is capable of forming a film by polymerization in the presence of air. A class of esterbodies which form films by autoxidation in air and are amendable to the process of my invention include unsaturated triglycerides of animal or vegetable origin (so-called "drying oils") which may be used in their raw state or refined in various manners such as by bodying, blowing or catalytic polymerization. Drying oils of vegetable origin include linseed, soya and dehydrated castor oil and commonly used oils of marine origin such as menhaden and sardine oils. Synthetic drying oils may also be used, such oils being prepared, for example, by reaction of a polyhydric alcohol such as pentaerythritol, trimethanol propane or sorbitol with mixtures of unsaturated fatty acids such as oleic, linoleic, linolenic, dimerized fatty acids, etc. Another useful class of oils includes modified or treated drying oils which are prepared by modification of natural or synthetic drying oils by reaction with an alpha-beta enol unsaturated acid such as maleic or fumaric, or by various unsaturated monomers such as styrene, cyclopentadiene, dicyclopentadiene, alpha methyl styrene, etc. Oleoresinous varnishes may also be gelled by the process of my invention. Oleoresinous varnishes are prepared by incorporation into a natural, synthetic or treated drying oil of a thermoplastic resin, such as for example modified and unmodified rosin esters, phenolic resins, petroleum and coal tar derived resins, natural gums such as kauri, Congo, dammar, etc. and others. One of the most important groups of esterbodies which is benefited by the practices herein taught is that of alkyd resins, the term "alkyd" as used herein referring to the esterification product of a polybasic acid and a polyhydric alcohol, modified with fatty oils or fatty acids (saturated or unsaturated). Alkyds are the most important class of esterbodies employed in the coatings industry due to their versatility of composition and properties. Acids commonly used in the preparation of alkyd resins include phthalic anhydride, maleic anhydride, fumaric acid, tetrahydro phthalic anhydride, isophthalic acid; useful polyalcohols include ethylene glycol, diethylene glycol, glycerine, pentaerythritol, and sorbitol.

Any of the above mentioned film-forming esters may be used as the sole vehicle to be thickened or, where the viscosity of the film-forming ester-containing material in the worked condition is too high the ester may be thinned with a suitable solvent for the ester. Useful esterbodies are not limited by acid number since esters having a wide range of acid numbers, from 0.05 to 60.0, will be gelled or thickened by the process of my invention.

To produce satisfactory thixotropic compositions from film-forming esters by use of the hydrated siliceous mineral in combination with a polyisocyanate the order of addition of components is not critical. However, gelation or thickening to thixotropic consistency will not take place when the siliceous mineral is pre-reacted with the polyisocyanate prior to the incorporation into the vehicle.

The following examples are given only for the sake of further illustrating my invention and are not to be construed as limiting the invention to specific compositions and ratios of materials employed therein.

*Example I*

In this example a 62 percent soya oil, pure alkyd, of 70 percent non-volatile content in mineral spirits, was mixed with 2,4 tolylene diisocyanate with and without a gel forming pigment to demonstrate the need of the pigment in preventing complete cross-linking and ultimate irreversible gelation of the resin.

|  | Parts by Weight | |
|---|---|---|
|  | A | B |
| 62% soya alkyd solution | 400 | 400 |
| 2,4 tolylene diisocyanate | 8.4 | 8.4 |
| Attagel 30 |  | 40 |

The above mixes were made by weighing the ingredients into a Waring Blendor jar and subjecting them to high speed mixing for 5 minutes each. The Attagel 30 is a colloidal grade of Attapulgus fuller's earch (attapulgite clay) which is sold by Minerals and Chemicals Corporation of America. After standing overnight in a sealed container Mix A had gelled to a strongly coherent mass and Mix B had gelled to a soft, thixotropic, nonpourable mass which poured when lightly agitated. After 4 weeks' standing, Mix A was a hard, dry solid and Mix B was substantially unchanged.

*Example II*

In this example the soya alkyd solution used in the composition of Example I was employed in the preparation of a gelled enamel composition. Ingredients employed were as follows:

Grinding paste: Parts by wt.
   62% soya alkyd solution _____ 125.0
   Rutile titanium dioxide _____ 300.0
   Attagel 20 _____ 25.0
   3,3'dimethyldiphenyl methane 4,4'diisocyanate _____ 8.0

Thin down:
   24% lead drier _____ 3.9
   6% cobalt drier _____ 1.6
   Anti-skinning agent _____ 1.0
   62% soya alkyd solution _____ 501.0
   Mineral spirits _____ 53.5

1019.0

The grinding paste ingredients were mixed in a Ross mixer for 10 minutes, then passed over the Kent 3 roll mill to obtain a 7 to 8 fineness of grind (North standard gauge). The resultant grinding paste was mixed with the thin down ingredients to obtain a homogeneous mixture. On standing overnight the enamel gelled to a non-flowing mass. Large quantities could easily be picked up on the brush and brushing, leveling and non-sagging properties were excellent. The enamel brushout dried overnight to a very hard, tack-free, high gloss film.

*Example III*

In this example a polyisocyanate and gel forming pigment cooperate to gel a solution of 57 percent soya oil pure alkyd in mineral spirits (65 percent non-volatile content).

A

Parts by wt.
57% soya oil alkyd _____ 400
2,4 tolylene diisocyanate _____ 8.7
Attagel 30 _____ 20.0

The above ingredients were weighed into Waring Blendor jars and mixed at high speed for 5 minutes. Mix A gelled overnight to a highly thixotropic nonflowing condition, but flowed readily with mild agitation, and was substantially unchanged after 4 weeks' standing in sealed containers.

*Example IV*

In this example gelled flat paints based on a 60 percent soya oil alkyd resin are prepared by two methods, e.g. (1) pre-gelling the vehicle, and (2) gelling the entire formulation in situ.

Pre-gelled vehicles of the following composition were prepared:

|  | Parts by Weight | |
|---|---|---|
|  | A | B |
| 60% soya oil alkyd, 50% NV solution in low odor mineral spirits | 282 | 282 |
| Low odor mineral spirits | 205 | 205 |
| 2,4 tolylene diisocyanate | 7.3 |  |
| 3,3'bitolylene,4,4'diisocyanate |  | 3.65 |
| Attagel 30 | 30 | 30 |
|  | 524.3 | 520.65 |

Vehicle A was prepared by mixing the ingredients at high speed with the Waring Blendor for 20 minutes. Vehicle B was prepared by mixing all ingredients for 5 minutes with a propeller type mixer. The mixture was then passed 4 times through a Morehouse mill, which was fitted with 100 grit stones. The vehicles A and B were permitted to gel prior to the preparation of flat paints therefrom. Vehicle A contained 5.2 percent and vehicle B contained 2.6 percent of the polyisocyanate based on the weight of the vehicle nonvolatile.

The properties of gelled flat paint formulations prepared with a pre-gelled vehicle are compared with a gelled flat formulation prepared by gelling a formulation including all components. Four paints were prepared: Paint 1, a flat paint including limestone filler and vehicle A (5.2 percent polyisocyanate, based on weight of vehicle nonvolatile); paint 2, a flat paint of composition identical to that of paint 1 except using vehicle B (2.6 percent polyisocyanate, based on the weight of vehicle nonvolatile) in lieu of vehicle A; paint 3, a flat paint identical in composition and method of preparation except including kaolin clay in lieu of an equal volume of limestone of paint 2; paint 4, identical in composition with paint 2 but differing in method of preparation, paint 4 being prepared by passing a mixture of all ingredients through the Morehouse mill. Attagel 10 is a colloidal grade of Attapulgus fuller's earth and ASP 400 is a coarse particle size, water washed kaolin clay, both produced and sold by Minerals and Chemicals Corporation of America. Compositions and quantities of all paints are tabulated below.

| | Parts by Weight | | | |
|---|---|---|---|---|
| Paint | 1 | 2 | 3 | 4 |
| Vehicle A | 261.5 | | | |
| Vehicle B | | 260 | 260 | |
| 60% soya alkyd solution | | | | 141.5 |
| Low odor mineral spirits | | | | 102 |
| 3,3'dimethyl diphenyl methane, 4,4'diisocyanate | | | | 1.84 |
| Attagel 10 | | | | 14.2 |
| ASP 400 | | | 180 | |
| CaSO₄ extended TiO₂ pigment | 190 | 190 | 190 | 190 |
| Wet ground limestone | 188 | 188 | | 188 |
| 24% lead drier | 0.7 | 0.7 | 0.7 | 0.7 |
| 6% cobalt drier | 0.6 | 0.6 | 0.6 | 0.6 |
| Anti-skinning agent | 0.2 | 0.2 | 0.2 | 0.2 |
| Total | 641.0 | 639.5 | 631.5 | 633.04 |
| Condition, overnight | v. stiff gel | soft gel | sl. stiff gel | soft gel |
| Brushing, overnight | poor, cons. drag. | good, sl. drag. | fair, mod. drag. | exc. |
| Leveling, overnight | exc. | exc. | exc. | exc. |
| Condition, 4 mos. age | no chg. | no chg. | no chg. | no chg. |
| Brushing, 4 mos. age | v. poor. | good | fair | exc. |

The polyisocyanate concentration, relative to that of the esterbody, was too high in paint 1 to achieve optimum effects.

*Example V*

In this example various drying oil-based exterior house paint formulations were prepared using a variety of siliceous minerals in conjunction with a diisocyanate. All paints were prepared by dispersing the ingredients in a Morehouse mill.

| | Parts by Weight | | |
|---|---|---|---|
| Paint | 1 | 2 | 3 |
| Kaolin clay | 570 | 570 | |
| Wet ground mica | 180 | 100 | |
| Attagel 20 | | 80 | |
| Chalking type titanium dioxide | 270 | 270 | 270 |
| Zinc oxide | 720 | 720 | 720 |
| Magnesium silicate extender | | | 638 |
| Z₃ viscosity linseed oil | 216 | 216 | 216 |
| Alkali refined linseed oil | 648 | 648 | 648 |
| 6% cobalt drier | 7 | 7 | 7 |
| 4% calcium drier | 10 | 10 | 10 |
| Mineral spirits | 316 | 316 | 316 |
| 3,3'dimethyl diphenyl methane diisocyanate | 24 | 24 | 24 |
| Total | 2,061 | 2,061 | 2,849 |
| Condition, overnight | soft gel | soft gel | soft gel |
| Brushing | exc. | exc. | exc. |
| Leveling | fair | fair | fair |

None of the paints formulated in these paints, or compositions of my invention prepared in other examples, flowed from an opened overturned container.

It will be understood that the invention as described is susceptible to numerous variations without departing from the spirit and scope thereof.

I claim:

1. A method of forming a thioxotropic composition which comprises mixing a liquid esterbody selected from the group consisting of a glycerol ester of an unsaturated long chain aliphatic monocarboxylic acid and an oil-modified alkyd resin, with from about 0.5 percent to 5.0 percent, based on the weight of said esterbody, of an arylene diisocyanate in the presence of particles of a hydrated siliceous material selected from the group consisting of hydrated calcium silicate, hydrated magnesium silicate, kieselguhr, kaolin clay, halloysite clay, montmorillonite clay and attapulgite clay, and aging said mixture at ambient temperature for a time sufficient to cause said mixture to form a thixotropic gel.

2. A method of forming a thixotropic coating composition which comprises mixing a liquid esterbody selected from the group consisting of a glycerol ester of an unsaturated long chain aliphatic monocarboxylic acid and an oil-modified alkyd resin, with from about 0.5 percent to 5.0 percent, based on the weight of said esterbody, of an arylene diisocyanate in the presence of particles of attapulgite clay, and aging said mixture at ambient temperature for a time sufficient to cause said mixture to form a thixotropic gel.

3. A method of forming a thixotropic coating composition which comprises mixing mineral spirits, an oil-modified alkyd resin, and an arylene diisocyanate in the presence of particles of attapulgite clay, said arylene diisocyanate being employed in amount of about 0.5 percent of 5.0 percent, based on the weight of said oil-modified alkyd resin, and said attapulgite clay being employed in amount at least about seven times the weight of said arylene diisocyanate, and aging said mixture at ambient temperature for a time sufficient to cause said mixture to form a thixotropic gel.

4. A method of forming a thixotropic coating composition which comprises mixing mineral spirits, an oil-modified alkyd resin and tolylene diisocyanate in the presence of particles of attapulgite clay, said tolylene diisocyanate being employed in amount of about 0.5 percent to 5.0 percent, based on the weight of said oil-modified alkyd resin, and said attapulgite clay being employed in amount at least about seven times the weight of said tolylene diisocyanate, and aging said mixture at ambient temperature for a time sufficient to cause said mixture to form a thixotropic gel.

5. A thixotropic composition produced by mixing a liquid esterbody selected from the group consisting of a glycerol ester of an unsaturated long chain aliphatic monocarboxylic acid and an oil-modified alkyd resin, with an arylene diisocyanate in amount from about 0.5 percent to 5.0 percent, based on the weight of said esterbody, in the presence of particles of a hydrated siliceous material selected from the group consisting of hydrated calcium silicate, hydrated magnesium silicate, kieselguhr, kaolin clay, halloysite clay, montmorillonite clay and attapulgite clay, and aging said mixture at ambient temperature for a time sufficient to cause said mixture to form a thixotropic gel.

6. A thixotropic paint which is produced by mixing mineral spirits, an oil-modified alkyd resin and tolylene diisocyanate in the presence of particles of attapulgite clay, said tolylene diisocyanate being employed in amount of about 0.5 percent to 5.0 percent, based on the weight of said oil-modified alkyd resin, and said attapulgite clay being employed in amount at least seven times the weight of said tolylene diisocyanate, and aging said mixture at ambient temperature for a time sufficient to cause said mixture to thicken into a thixotropic gel.

References Cited in the file of this patent

UNITED STATES PATENTS

| | | |
|---|---|---|
| 2,321,257 | Spicer | June 8, 1943 |
| 2,464,202 | Rust | Mar. 15, 1949 |
| 2,572,252 | Erasmus | Oct. 23, 1951 |
| 2,609,349 | Cass | Sept. 2, 1952 |
| 2,645,623 | Hermann | July 14, 1953 |
| 2,647,063 | Willis et al. | July 28, 1953 |
| 2,729,618 | Muller et al. | Jan. 3, 1956 |
| 2,769,826 | Yoho | Nov. 6, 1956 |
| 2,798,859 | Bruce | July 9, 1957 |
| 2,886,455 | Doggett | May 12, 1959 |

FOREIGN PATENTS

| | | |
|---|---|---|
| 529,108 | Canada | Aug. 14, 1956 |
| 565,777 | Great Britain | Nov. 28, 1944 |

OTHER REFERENCES

Heiss et al.: "Jour. Ind. and Eng. Chem." 46, 1498–1503 (1954).

UNITED STATES PATENT OFFICE
CERTIFICATE OF CORRECTION

Patent No. 2,975,071                            March 14, 1961

Thomas H. Ferrigno

It is hereby certified that error appears in the above numbered patent requiring correction and that the said Letters Patent should read as corrected below.

Column 4, line 65, for "amendable" read -- amenable --; column 6, line 38, strike out "A", and insert the same between lines 39 and 40, under "Parts by wt." as a column heading for the figures; column 7, Example V, under the heading "2", and opposite Total for "2,061" read -- 2,961 --.

Signed and sealed this 15th day of May 1962.

(SEAL)
Attest:

ERNEST W. SWIDER                            DAVID L. LADD
Attesting Officer                                 Commissioner of Patents